United States Patent [19]

Maeno

[11] Patent Number: 5,178,374
[45] Date of Patent: Jan. 12, 1993

[54] HYDRAULIC DAMPING DEVICE

[75] Inventor: Takashi Maeno, Inazawa, Japan

[73] Assignees: Toyoda Gosei Co. Ltd., Nishikasugai; Toyota Jidosha Kabushiki Kaisha, Toyota, both of Japan; a part interest to each

[21] Appl. No.: 709,875

[22] Filed: Jun. 4, 1991

[30] Foreign Application Priority Data

Jun. 5, 1990 [JP] Japan .................. 2-146835

[51] Int. Cl.⁵ .............................. F16F 9/00
[52] U.S. Cl. .................. 267/140.13; 180/312; 248/636; 248/562; 267/219
[58] Field of Search ........... 267/140.1 R, 140.1 A, 267/219; 180/300, 312, 902

[56] References Cited

U.S. PATENT DOCUMENTS

| | | | |
|---|---|---|---|
| 4,682,753 | 7/1987 | Clark | 267/140.1 A X |
| 4,711,206 | 12/1987 | Andra et al. | 248/636 X |
| 4,781,362 | 11/1988 | Reuter et al. | 248/562 X |
| 4,787,610 | 11/1988 | Kojima et al. | 248/636 X |
| 4,852,864 | 8/1989 | Bitschkus et al. | 267/219 |
| 5,009,404 | 4/1991 | Hirazawa | 267/140.1 A |

FOREIGN PATENT DOCUMENTS

| | | | |
|---|---|---|---|
| 305246 | 3/1989 | European Pat. Off. | 267/140.1 |
| 60-121339 | 6/1985 | Japan . | |
| 61-65934 | 4/1986 | Japan . | |
| 292539 | 12/1990 | Japan | 267/140.1 |

Primary Examiner—George E. A. Halvosa
Attorney, Agent, or Firm—Cushman, Darby & Cushman

[57] ABSTRACT

A hydraulic damping device has a pair of supporting members to be secured to a vibrating body and a frame, respectively, and a rubber block disposed between the supporting members. A concave surface of the rubber block and a rubber sheet which is joined to the rubber block together define a liquid chamber filled with a damping liquid. A partition defines the liquid chamber is divided into a main liquid chamber and an auxiliary liquid chamber. The partition has an opening which is closed with an elastic rubber wall. The partition is also provided with a throttle passageway which communicates with both the main liquid chamber and the auxiliary liquid chamber. The elastic rubber wall has a flat surface facing the main liquid chamber, and a concavely curved surface facing the auxiliary liquid chamber so as to have an arch-shaped cross-section. An inner periphery of the partition, which an outer periphery of the elastic rubber wall contacts, has an inclined surface so that the diameter of the opening of the partition decreases from the side of the main liquid chamber toward the auxiliary liquid chamber.

4 Claims, 1 Drawing Sheet

HYDRAULIC DAMPING DEVICE

BACKGROUND OF THE INVENTION

1. Field of the Invention

The present invention relates to a hydraulic damping device, and more particularly to a hydraulic damping device including a partition having a central opening which is closed by an elastic rubber wall for both restraining low-frequency vibrations of large amplitude and absorbing high-frequency vibrations of small amplitude.

2. Description of the Prior Art

Conventional hydraulic damping devices are composed of a vessel-shaped thick rubber block which supports a vibrating body, and a deformable rubber sheet which closes an opening in the vessel-shaped thick rubber block. A main liquid chamber and an auxiliary liquid chamber are formed within the thick rubber black. The main liquid chamber is separated from the auxiliary liquid chamber by a partition which has a throttle passageway. The auxiliary liquid chamber is defined on its bottom side by the deformable rubber sheet. The hydraulic damping device damps vibration by forcing damping liquid enclosed within the main liquid chamber to flow into the auxiliary liquid chamber through the throttle passageway of the partition. Heretofore, various devices have been proposed to reduce high-frequency variations (Japanese unexamined patent publication Sho 60-121339, Japanese unexamined patent publication Sho 61-65934). These conventional devices are generally provided with an elastic rubber wall which closes an opening formed in the central portion of the partition.

When high-frequency vibrations of small amplitudes are input, the elastic rubber wall deforms and absorbs the build-up of the inner pressure of the main liquid chamber.

When low-frequency vibrations of large amplitudes are input to the hydraulic damping device, a higher pressure is built up in the main liquid chamber, as compared to high-frequency vibrations of small amplitude. This higher pressure is applied to the elastic rubber wall.

In order to resist that higher pressure in the above-described conventional devices, upper and lower surfaces of the elastic rubber wall have been formed into symmetric concave surfaces (see, for example, Japanese unexamined patent publication Sho 60-121339) or into parallel surfaces (see, for example, Japanese unexamined patent publication Sho 61-65934). Such elastic rubber walls which have concave or parallel surfaces, however, are likely to be fatigued as a result of the large shear stress generated in its peripheral portion, which is joined to the partition.

SUMMARY OF THE INVENTION

It is an object of the present invention to provide a hydraulic damping device wherein an elastic rubber wall is provided to close the opening of the partition which has excellent durability and will have a greater useful life.

The hydraulic damping device of the present invention has a pair of supporting members which are secured to a vibrating body and a frame, respectively, and a rubber block disposed between the supporting members. The rubber block has a liquid chamber defined by a concave surface of the rubber block and a rubber sheet which is joined to the rubber block so as to close the liquid chamber. A partition is provided for dividing the liquid chamber into a main liquid chamber and an auxiliary liquid chamber. The partition has an opening and this opening is closed with an elastic rubber all. The partition is provided with a throttle passageway interconnecting the main liquid chamber and the auxiliary liquid chamber. The elastic rubber wall has a flat surface facing the main liquid chamber, and a concavely curved surface facing the auxiliary liquid chamber so as to have an arch-shaped cross-section. Accordingly, the thickness of the elastic rubber wall gradually decreases from its outer peripheral portion towards its central portion.

When low-frequency vibrations of large amplitude are input to the hydraulic damping device of the present invention, a high pressure is built up in the main liquid chamber. This causes a large deforming force to be applied to the elastic rubber wall. However, the elastic rubber wall of the present invention will not be excessively deformed because the elastic rubber wall has an arch-shaped cross section. Therefore, the elastic rubber wall exhibits good durability, and stress is will not be concentrated in a peripheral portion of the elastic rubber wall.

Furthermore, by forming the inner periphery of the partition, which defines the opening, into an inclined surface so that the diameter of the opening gradually decreases from the main liquid chamber side to the auxiliary liquid chamber side, shear stresses which can be generated in the peripheral portion of the elastic rubber wall can be reduced.

In addition, by providing a flat surface in at least one part of the inclined inner periphery of the partition in parallel with the upper surface of the partition, the shear stresses which may be generated in the flat surface can be reduced to nearly zero. As a result, shear stress which can be generated in the overall inner periphery of the partition can be further reduced.

If the elastic rubber wall need not to have increased durability, it is unnecessary to incline the inner periphery of the partition nor to provide a flat surface in the inner periphery of the partition.

The above-described flat surface may be provided in several parts of the inclined inner periphery of the partition.

BRIEF DESCRIPTION OF THE DRAWING

Other objects, features and characteristics of the present invention will become apparent upon consideration of the following description and the appended claims with reference to the accompanying drawings, all of which form a part of the specification.

DETAILED DESCRIPTION OF THE PRESENTLY PREFERRED EXEMPLARY EMBODIMENT

Figure 1:
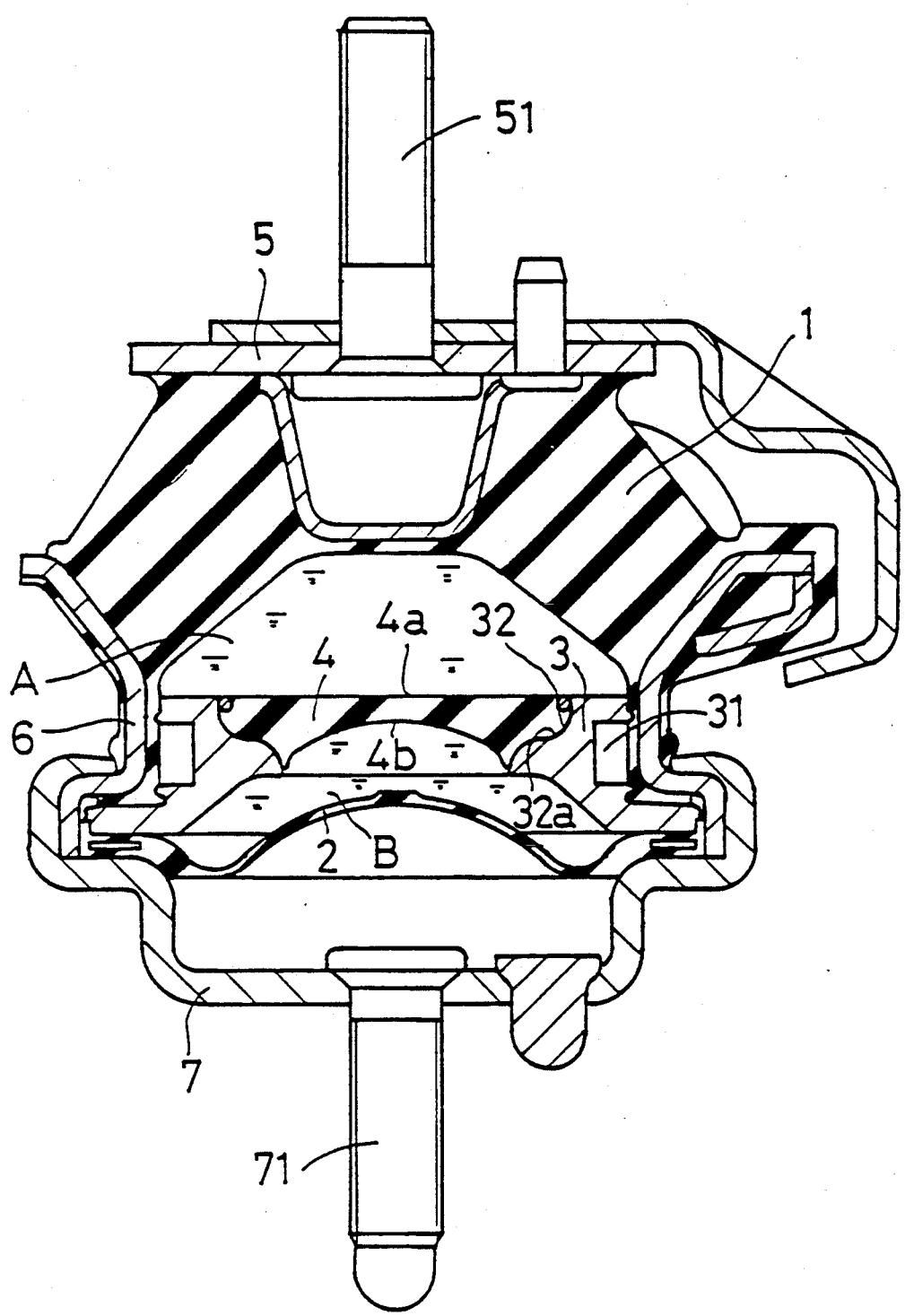
FIG. 1 is a cross-sectional view of one embodiment of a hydraulically damping device in accordance with the present invention.

In accordance with a preferred embodiment of the invention, an upper plate 5 is joined to an upper surface of a vessel-shaped thick rubber block 1. A bolt 51 is secured to the upper plate 5 and supports an engine (not shown). an upper portion of a cylindrical side plate 6 is embedded within a lower portion of the rubber block 1. A lower portion of the cylindrical side plate 6 is secured to an upper portion of a bottom plate 7 by caulking. The bottom plate 7 is secured to a vehicle frame by a bolt 71.

A ring shaped partition 3 is provided in a space defined by the rubber block 1 and the bottom plate 7. A rubber sheet 2 is provided under the partition 3. The peripheral portions of the respective partition 3 and rubber sheet 2 are secured to an inner periphery of the bottom plate 7 by caulking so as to be integral with a lower end of the cylindrical side plate 6. An opening 32 is formed in the central portion of the partition 3. The opening 32 is closed by an elastic rubber wall 4. The periphery of the elastic rubber wall 4 is vulcanization to the inner periphery of the partition 3 which defines the opening 32.

The rubber block 1 and the rubber sheet 2 together define a closed chamber. The closed chamber is divided into a main liquid chamber A and an auxiliary liquid chamber B by partition 3 and elastic rubber wall 4. These chambers A, B are filled with a damping liquid.

A recess 31 is defined continuously along an outer periphery of the partition 3 so as to communicate with both the main liquid chamber A and the auxiliary liquid chamber B. Recess 31 acts as a throttle passageway.

The inner periphery of the partition 3 is formed as an inclined surface. Accordingly, the diameter of the opening 32 gradually decreases from the main liquid chamber A side toward the auxiliary liquid chamber B. Furthermore, at a middle of the inclined surface, a nearly horizontal flat surface 32a is formed. The horizontal flat surface 32a is nearly parallel with an upper surface of the partition 3.

The elastic rubber all 4 has an upper flat surface 4A which is flush with the upper surface of the partition 3. A lower surface 4b of the elastic rubber wall 4, which faces the auxiliary liquid chamber B, is a concavely curved surface. Accordingly, the thickness of the elastic rubber wall 4 gradually decreases from its peripheral portion to its central portion so that the elastic rubber wall 4 has an arch-shaped cross-section.

With a hydraulic damping device having the above-described configuration, when high pressure builds up in the main liquid chamber A due to the input of low-frequency vibrations of large amplitude, the elastic rubber wall 4 does not excessively deformed because the elastic rubber wall 4 has an arch-shaped cross section. Accordingly, a sufficiently high pressure can be built up in the main liquid chamber A, and highly pressurized damping liquid can flow into the auxiliary liquid chamber B the throttle passageway 31, thereby achieving a speedy vibration damping operation against low-frequency vibrations of large amplitude.

In accordance with the present embodiment, the stresses, which would be generated in the peripheral portion of the elastic rubber wall 4 can be restrained because the elastic rubber wall 4 has an arch-shaped cross section. Even if stresses are generated, it is mainly compressive or tensile stress. Shear stresses are generated at only a small rate because the inner periphery of the partition 3, which defines the opening 32, has the above-described configuration.

The foregoing structure and functional advantages are combined in accordance with the invention to positively prevent fatigue of the elastic rubber wall 4.

With the hydraulic damping device of the present embodiment, when high-frequency vibrations of small amplitude are input, the thin central portion of the elastic rubber all 4 deforms so as to absorb the variation in pressure in the main liquid chamber A, thereby absorbing and reducing high-frequency vibrations of small amplitudes.

In order to obtain a sufficient bond between the elastic rubber wall an the partition, conventionally, adhesive has been applied to respective edges of both upper and lower surfaces of the partition, and when an outer peripheral portion of the elastic rubber wall has been bonded to the edges of the both upper and lower surfaces of the partition. This conventional bonding method has deficiencies.

In contrast, with the present embodiment, adhesive is applied to the inner periphery of the partition 3 from only the upside of the partition 3, and then, the outer peripheral portion of the elastic rubber wall 4 is bonded to the inner periphery of the partition 3. With this method, a sufficiently high strength bond of the elastic rubber wall 4 to the partition 3 can be obtained a shortened joining process.

As described above, the hydraulically damping device of the present invention can effectively prevent fatigue of the elastic rubber wall, whereby good vibration damping characteristics can be maintained over a long period of time.

What is claimed is:

1. A hydraulic damping device comprising:
   a pair of supporting members;
   a rubber block disposed between said supporting members, said rubber block having a concave surface;
   a rubber sheet which is operatively coupled to said rubber block so as to define a liquid chamber between said concave surface of said rubber block and said rubber sheet;
   a partition means for dividing said liquid chamber into a main liquid chamber and an auxiliary liquid chamber, said partition means having an inclined inner peripheral wall surface extending between flat end faces which defines an opening at a central portion of said partition means, whereby a diameter of said opening of said partition means decreases from a maximum at one of said end faces of said partition means which faces said main liquid chamber to a minimum diameter spaced from said one said end faces, at least a portion of said inclined inner peripheral wall surface of said partition means including a flat surface being defined in a plane which is substantially parallel to an end face of said partition means;
   an elastic rubber wall element for closing said opening of said partition, said elastic rubber wall element having a flat surface facing said main liquid chamber, and a concavely curved surface facing said auxiliary liquid chamber whereby a thickness of said elastic rubber wall element gradually decreases from an outer peripheral portion thereof towards a central portion thereof, an inclined outer peripheral wall surface of said elastic rubber wall element contacting said inclined inner peripheral wall surface of said partition means along substantially the entire length of said inclined inner peripheral wall surface of said partition means; and
   a throttle passage defined in said partition means for fluidly coupling said main liquid chamber and said auxiliary liquid chamber.

2. A hydraulic damping device as in claim 1, wherein said rubber block is vessel-shaped in cross-section, said rubber block having an upper end defining an upper surface and a lower end and wherein said device further comprises:
- an upper plate mounted to said upper surface of said rubber block;
- a cylindrical side plate having an upper end and a lower end, said lower end of said rubber block being coupled to said upper end of said cylindrical side plate and an outer peripheral surface of said partition means contacting an inner peripheral surface of said cylindrical side plate, and
- a vessel-shaped bottom plate disposed under said rubber sheet, an outer peripheral edge of said rubber sheet and an outer peripheral edge of said partition means being secured to said bottom plate and to said cylindrical side plate by caulking so as to be integral therewith.

3. A hydraulic damping device as in claim 1, wherein said liquid chamber is filled with a damping liquid.

4. A hydraulic damping device as in claim 1, wherein said main liquid chamber is defined above said partition means and said auxiliary liquid chamber is defined under said partition means and wherein a recess is defined in an outer peripheral edge of said partition means for fluidly coupling said main liquid chamber and said auxiliary liquid chamber, said recess thereby defining said throttle passageway.

* * * * *